Sept. 6, 1932.     F. A. DONALDSON     1,875,427
AIR CLEANER
Filed Sept. 13, 1930     2 Sheets-Sheet 1

Inventor
Frank A. Donaldson
By his Attorneys
Merchant and Kilgore

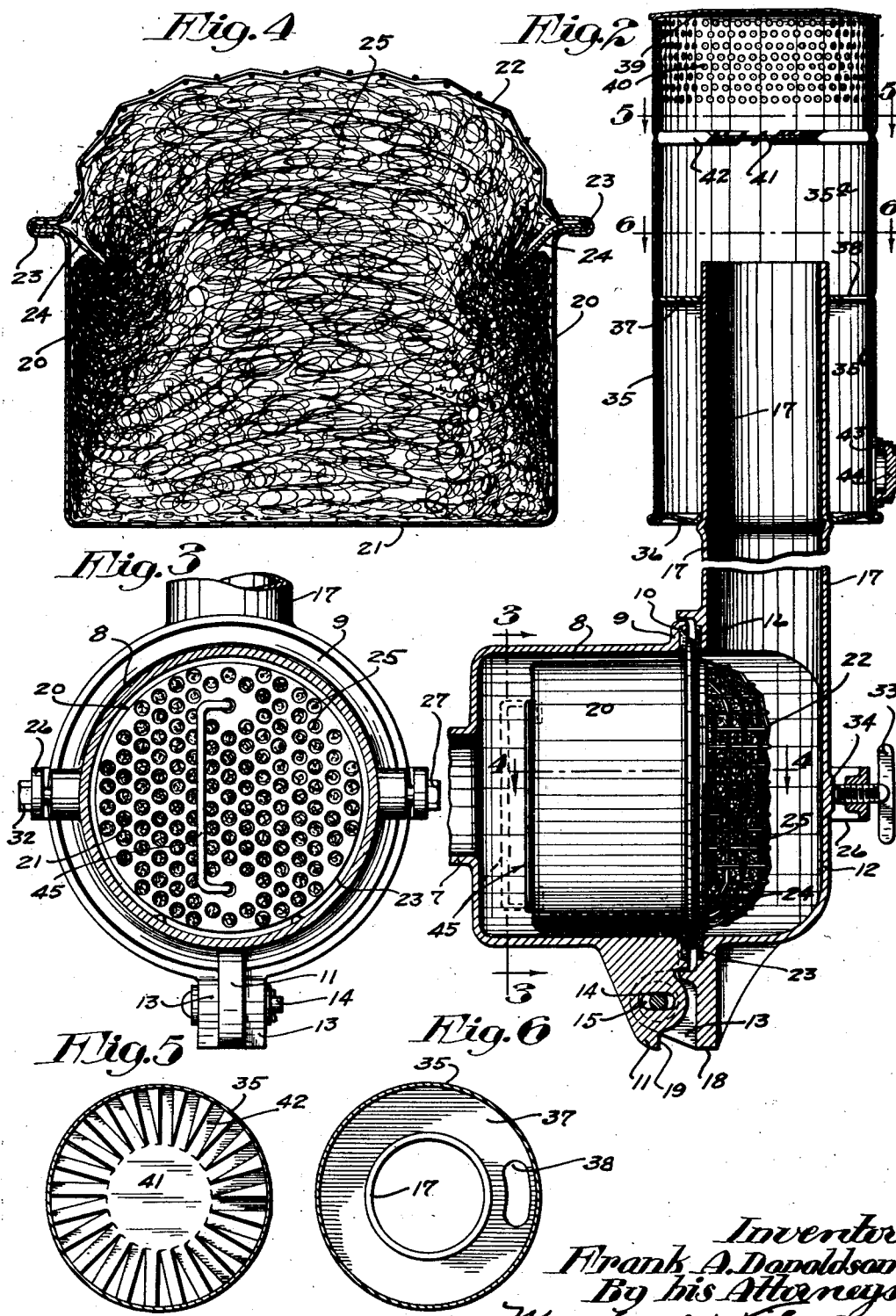

Patented Sept. 6, 1932

1,875,427

UNITED STATES PATENT OFFICE

FRANK A. DONALDSON, OF MINNEAPOLIS, MINNESOTA

AIR CLEANER

Application filed September 13, 1930. Serial No. 481,632.

My present invention provides an extremely simple and highly efficient air cleaner adapted for a wide range of use, but especially designed and particularly adapted for use in connection with internal combustion engines of farm tractors; and generally stated, the invention consists of the novel devices, combinations of devices and arrangement of parts hereinafter described and defined in the claims.

The engines of farm tractors, as is well known, are required to work in the presence of air that is heavily charged with dust and which, if allowed to enter the cylinders of the internal combustion engines, cause abnormally rapid wear thereof and of the pistons and piston rings. I have found that to remove a large amount of dust from air such as encountered in the use of farm tractors requires first, a cyclonic or centrifugally-acting dust collector to remove the major portion of the dust from the air, and second, a filter-acting cleaner for removing substantially all of the remaining and minor portion of the dust. In air filters, moss or similar fibrous material is usually packed in a shell or container and through which the air is caused to pass and which serves to intercept the dust from the air passing therethrough to the carburetor of the internal combustion engine. An important feature of the invention is directed to the construction and arrangement of the cartridge made up of the shell and the filtering material contained therein. Another feature of the invention is directed to means whereby removal of the dust from the dust collector or primary cleaner is made an easy and almost imperative matter whenever access is had to the filter for the purpose of removing and cleaning the same. The above features will be elaborated upon and other features noted in connection with description of a commercial form of the cleaner illustrated in the accompanying drawings, wherein like characters indicate like parts throughout the several views.

Referring to the drawings:

Fig. 2 is a vertical axial section taken through the cleaner shown in Fig. 1;

Fig. 3 is a section taken on the line 3—3 of Fig. 2;

Fig. 4 is a detail in horizontal section showing the cartridge including the shell and filler of the filter;

Fig. 5 is a section taken on the line 5—5 of Fig. 2; and

Fig. 6 is a section taken on the line 6—6 of Fig. 2.

Figure 1:
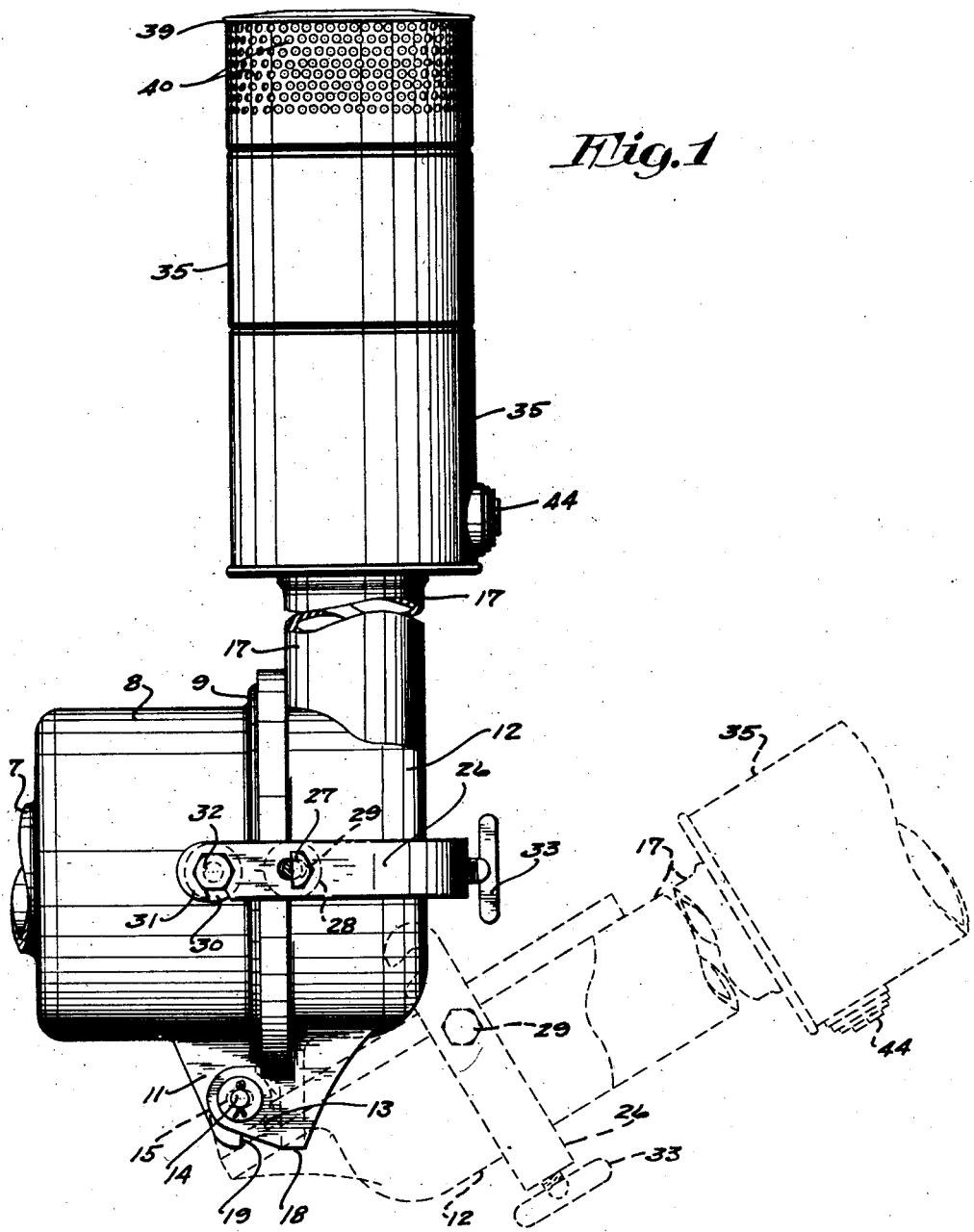
Fig. 1 is a side elevation with some parts broken away showing the complete air cleaner, a released position of one of the parts being indicated by dotted lines.

The carburetor of the internal combustion engine to which this air cleaner is designed to deliver air is not shown, but its intake will be connected to the neck 7 of a drum-like casing 8 that is disposed horizontally and affords a filtering chamber to receive the filtering cartridge including the shell and filler above referred to. This shell 8 at its open side or end, as shown, is provided with a rim or outstanding annular flange 9 that holds a packing ring or gasket 10. At its bottom, the shell 8 is provided with a depending hinge lug 11. The open end of the shell 8 is arranged to be closed by a hood or cover 12 which, at its bottom, is formed with a hinge lug 13 that is pivotally connected to hinge lug 11 by a hinge pin 14 that works through an elongated slot 15 formed in lug 11. Facing the flange 9, hood 12 is provided with an inset annular gasket of a packing ring 16. An air intake stack 17 of considerable length projects upward from the hood 12, being as shown cast integral therewith but capable of being otherwise formed. A stop surface 18 on lug 13 engages a stop surface 19 on lug 11 to limit the downward movement of hood 12 and stack 17 substantially to the position shown by dotted lines in Fig. 1.

The filter cartridge referred to above and as preferably designed and illustrated in the drawings comprises a drum-like containing shell 20 formed or provided at its delivery end with a perforated head 21 and provided at its receiving end with an open head preferably of quite heavy woven wire member 22 pressed outwardly concavo-convex and having an outturned ring rigidly and securely clamped to the outturned rim of the shell 20 by suitable means but preferably and as shown by a clamping collar 23 pressed U-shape in cross section. This clamping collar 23 also securely holds in position a truncated conical deflecting flange 24 that constitutes an important feature of this invention above briefly referred to. The numeral 25 indicates the fibrous material such as moss that is packed within the cartridge and performs important functions which will hereinafter be more fully discussed.

Here it should be noted that the outturned flange of the shell 20 and woven wire head 22 combined with the clinched ring 23 afford an anchoring flange that fits snugly between the opposing gaskets 10 and 16, as best shown in Fig. 2, thus positioning the shell 20 within the casing 8 and the bulged head 20 and filler contained therein within the head 12, thereby cutting off access between the hood 12 and casing 8 except through the filtering material 25.

For tightly clamping the hood 12 in working position and the gaskets 9 and 16 onto the outstanding rim of the filter cartridge, a suitable clamping device is provided and this, as shown, is in the form of a yoke 26, the arms of which short of their ends, are pivotally connected to the sides of the hood 12 by headed studs or screws 27. Studs 27, as shown, are applied to bosses 28 on the sides of the hood 12 and the arms of bail 26 and said studs work through slots 29 formed in the yoke so that said yoke is permitted a slight longitudinal movement in respect to the head.

At their extreme ends, the arms of the yoke 26 are provided with lateral notches 30 that form hook-acting ends 31 that are engageable with studs or outstanding lugs 32 formed on the sides of the casing 8. The purpose of the slots 29 is to permit the hooks 30 to be readily engaged with the lugs 32 by pivotal movement of the yoke 26. At its central portion, the yoke 26 is provided with a clamping screw 33 which, when tightened against an axial boss 34 on the hood 12, causes a tight joint and equal pressure all the way around between the gaskets 9—16 and the outstanding flange of the filter cartridge.

The primary air cleaner in the form of the cyclonic or centrifugally acting dust collector is applied on the upper end of the air stack 17 and, as shown, comprises a cylindrical casing 35 into which the upper end of the stack projects part way or as shown about half way up through the same. At its lower end, the casing 35 is provided with an annular head 36 that closes the bottom of the annular chamber surrounding the upper end of the stack. An upper annular head or flange 37 connects the upper portion of the stack to the intermediate portion of the casing 35 and divides the same into an upper air chamber 35$^a$ and a lower or dust chamber 35$^b$. Head or flange 37 is provided with one or more dust passages 38. In the particular structure illustrated, the casing 35 is closed at its extreme upper end by a head 39 but has a large number of lateral perforations 40 affording air intake passages below said head. Below the perforations 40 and secured within the casing 35 is a horizontal disc-like partition 41, the central portion of which is imperforate but the annular outer portion of which is formed with oblique deflecting blades 42 that cause the air drawn into and downward through the casing to take up a whirling motion.

Near the bottom of its dust chamber 35$^a$ casing 35 is provided with a dust discharge neck or passage 43 that is normally closed by a removable plug 44; and here it is important to note that this dust discharge passage is located at that side of the dust chamber 35$^a$ that is turned downward when the hood 12, together with the stack 17 and casing 35, is moved pivotally downward to the position shown by dotted lines in Fig. 1. It may be here also noted that the perforated inner head 21 of the filter cartridge shell 20 is provided with a bail-like hand-piece 45 by means of which it may be readily handled for the purpose of cleaning when the cartridge is removed from the cleaner.

In filling the shells or containers of dust collectors with fibrous material such as moss or the like, the filtering material is usually placed in the container one handful or parcel after the other and is quite tightly compressed within the container. Even when this is done, with the ordinary container, it has been found practically impossible to form sufficiently tight joints between the outer portion of the filtering material and the container to prevent excessive flow of air along the inner surface of the container. Moreover, unless the material is very carefully and tightly packed, there will be formed between the different installments or parcels of the filtering material joints through which there will be an excessive flow of air. The above objectionable features and others are eliminated by the use of the deflecting annular flange 24. With the use of this flange, the filtering material is first tightly packed into the shell 20 and then the flange is forced downward to position, thereby compressing the marginal underlying filtering material into much more compact arrangement than at the central or intermediate portion of the filtering material. Moreover, this flange projects far inward from the inner surface of the containing shell and positively prevents the flow of air directly along the inner surface of the shell.

In this arrangement, therefore, there are two reasons why there will not be an excessive flow of air along the inner surface of the shell, to wit: the increased compactness of the filtering material adjacent the inner surface of the shell and the cut-off direct flow of air along the inner surface of the shell. By reference to Fig. 4, it will be noted that air attempting to pass close to the inner surface of the shell will have to take a tortuous line of travel through the relatively hard compact portion of the filling material and there will, therefore, be no excessive flow of air adjacent or close to the inner surface of the shell and an even flow of air through the entire filtering material or possibly a little freer flow of air through the central portion of the filtering material. The outward bulging of the wire head 22 not only gives a larger surface exposed for collection of dust than would a flat surface, but increases the depth of filtering material at and toward the axial portion of the filter. Also the exposed dust-collecting surface of the filtering material is projected into the hood 12 where the efficiency of its separating action is increased.

Air entering the upper portion of the casing 35 will, by the oblique deflecting blades 42, be caused to take up a whirling motion within the separating chamber 35ᵃ so that under the action of centrifugal force, the major portion of the dust, in practice, 80 to 85 per cent thereof, will be thrown outward against the walls of said chamber and will find its way through the port 38 through the dust chamber 35ᵇ.

The air thus relieved from the major portion of the dust will be drawn down into the hood 12 and through the filtering material and will be intercepted by and collected on the outer surface and adjacent outer portions of the filtering material, although some of the dust will work its way well into the filtering material. By this filtering material, all or substantially all of the dust will be taken from the air and air free from dust will be delivered to the carburetor of the engine.

When the filtering material needs cleaning, the hinged portion of the cleaner will be turned down to the dotted line position of Fig. 1; thereby affording access to the filtering cartridge and preventing ready removal thereof; and as already indicated, when this is done, while the plug 44 is removed, the dust from the chamber 35 will be discharged by the very act of turning the said parts to the dotted line position. When the filter cartridge is removed, it will naturally be held by the bail or handle 45 so that in dipping the filter into oil for cleaning, the dust-receiving end of the filtering material will be turned downward and subjected to the draining action of the oil. This cleans the filter by an action just reverse to the dust-collecting action and instead of washing the collected dust on through the filter washes it back to and from the receiving surface.

In practice I have usually employed moss as a fibrous filling material but various other fibrous or fiber-like materials may be used such, for example, as hair and "metallic shavings", sometimes designated as metal wool.

The efficiency of the device described and all of the facts stated have been thoroughly demonstrated in practice. Obviously the preferred form of the device illustrated is capable of modification within the scope of the invention as herein disclosed and claimed.

It should, of course, be understood that filters of the type here described are soaked in oil, before using and after a period of use, when they become partially clogged by collected dust, said filters are removed and dipped in gasoline, kerosene or suitable light oil for cleaning and then they are redipped in a heavier oil to render the same ready for another period of use.

What I claim is:

1. An air cleaner comprising a casing that is open at one end and provided at the other end with means for attachment to a carburetor, a hood hinged to the open end of said casing for opening and closing movements and provided with an air intake, an air filter in said casing between said carburetor connection and air intake and arranged to be held in position by said hood when the same is closed and being removable when said hood is open, a primary air cleaner carried by said hood for movements therewith and arranged to discharge into the intake thereof, and having a dust-receiving chamber that is thrown into a dust-dumping position when said hood is moved hingedly to an open position to permit removal of said air filter.

2. An air cleaner comprising a casing provided at one end with a marginal clamping rim and at its other end with means for attachment to a carburetor, a hood hinged to said casing for opening and closing movements and provided with an air intake, a filter cartridge in said casing between the inlet and means for attachment to a carburetor, said cartridge comprising a drum filled with filtering material and said drum having an outstanding flange that is adapted to be clamped between the marginal clamping rim of said casing and the hinged hood thereof and thereby hold said cartridge in position when the hood is closed, but permitting removal of said cartridge when said hood is open, a stack carried by and movable with said hinged hood and communicating with the air intake thereof, and a primary cleaner mounted on said stack, said primary cleaner having a dust-receiving chamber that is thrown into a dumping position when said hood is moved hingedly to an open position to permit removal of said filter cartridge.

3. An air filter comprising a shell having an internal, truncated, conical deflecting flange and being filled with fibrous material, said fibrous material being compressed adjacent the shell by said flange and extending through the flange in an undivided mass.

4. An air cleaner comprising a shell that is perforated at one end for the admission of air and at its other end for the discharge of air and having intermediate its ends an internal truncated conical deflecting flange that converges toward the discharge end of said shell, and in said shell a fibrous filtering material that extends through said flange in an undivided mass, the outer edge portion of said fibrous material intermediate said flange and the discharge end of said shell is compressed by said flange to a density considerably greater than that near the axis of the shell.

In testimony whereof I affix my signature.

FRANK A. DONALDSON.